US007113840B2

(12) United States Patent
Chen

(10) Patent No.: US 7,113,840 B2
(45) Date of Patent: Sep. 26, 2006

(54) DISPATCH METHOD AND SYSTEM

(75) Inventor: Yen-Hung Chen, Changhua Hsien (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 302 days.

(21) Appl. No.: 10/749,916

(22) Filed: Dec. 31, 2003

(65) Prior Publication Data

US 2004/0236448 A1    Nov. 25, 2004

(30) Foreign Application Priority Data

Jan. 2, 2003    (TW) ............................. 92100036 A

(51) Int. Cl.
*G06F 19/00* (2006.01)
(52) U.S. Cl. ................. 700/117; 700/95; 700/106; 700/121
(58) Field of Classification Search ............... 700/90, 700/95, 109, 117, 121, 103, 106; 702/84
See application file for complete search history.

(56) References Cited

U.S. PATENT DOCUMENTS

| 5,014,208 | A | * | 5/1991 | Wolfson ....................... 700/99 |
| 5,696,689 | A | * | 12/1997 | Okumura et al. ............ 700/121 |
| 5,841,677 | A | * | 11/1998 | Yang et al. .................. 702/176 |
| 6,092,000 | A | * | 7/2000 | Kuo et al. ................... 700/115 |
| 6,335,542 | B1 | * | 1/2002 | Miyasaka ..................... 257/66 |
| 6,604,012 | B1 | * | 8/2003 | Cho et al. ................... 700/121 |

* cited by examiner

*Primary Examiner*—Jayprakash N. Gandhi
(74) *Attorney, Agent, or Firm*—Thomas, Kayden, Horstemeyer & Risley

(57) ABSTRACT

A dispatch method and system for Long-duration Processing Batch Equipment (LPBE). The system includes LPBE, a plurality of equipment tools preceding the LPBE, and a dispatch unit. The LPBE retrieves equipment candidates having capabilities compatible with those of the LPBE from among the equipment tools, and selects one candidate. Lots corresponding to the selected candidate are then retrieved, grouped and sorted to obtain a plurality of batches, and at least one of the batches is designated as a reserve batch. Thereafter, the selected candidate performs a process corresponding to the capability on the reserve batch, and forwards the processed batch to the LPBE.

35 Claims, 3 Drawing Sheets

DISPATCH METHOD AND SYSTEM

BACKGROUND

The present invention relates to manufacturing management, and particularly to a dispatch method and system for Long-duration Processing Batch Equipment (LPBE) that reserves lots at preceding steps in the manufacturing process.

In semiconductor manufacturing, LPBE, such as furnace equipment utilizes long process time and batch process. As it requires several hours to rework defective lots, processing quality and manufacture scheduling are important.

The manufacturing department controls process quality by defining processing time constraints for each lot passing through LPBE. The time between tracking out from the preceding step's equipment and tracking in to the subsequent step's equipment for each lot should conform to the processing time constraint. Before entering LPBE, lots must enter the preceding step's equipment for removal of residual particles in advance. In practice, each preceding step's equipment provides lots for different LPBE. Since there is no mechanism between the preceding step's equipment and LPBE to manage lot dispatch and stream, the quantity of dispatched lots for each LPBE may differ. Therefore, the utilization rate of LPBE having fewer lots may be decreased, and those having more lots may be delayed, undermining the processing time constraint, such that the lots needs to be reworked, thereby wasting processing resources.

SUMMARY

The present invention is proposed to address and solve the aforementioned issues. It is noted that the present invention is applicable to any factory, service supplier, equipment and product.

Accordingly, it is an object of the present invention to provide a dispatch method and system for LPBE that reserves lots at preceding steps in the manufacturing process.

To achieve the above object, the present invention provides a dispatch method and system. The dispatch system includes LPBE, a plurality of equipment tools preceding the LPBE, and a dispatch unit. First, the LPBE retrieves equipment candidates having capabilities compatible with those of the LPBE among the preceding step's equipment in the dispatch unit, and selects at least one. Then, lots corresponding to the selected candidate are retrieved, grouped and sorted to obtain a plurality of batches, with at least one designated as a reserve batch. Thereafter, the selected candidate performs processes corresponding to the compatible capability on the reserve batch, and forwards the processed batch to the LPBE.

The lots are first grouped according to the capabilities of the LPBE, such that a plurality of lot groups is obtained. Then, the lots of each lot group and the lot groups are sorted according to a priority rule, such that the batches are generated. Additionally, each lot group is further split if the number of lots in the lot group exceeds the maximum loading that can be handled by the LPBE.

The priority rule is used to determine whether designated hot lots exist in any of the lot groups, and determine stage target, priority, and queue time for the lots in each lot group, and the quantity of wafers in each lot group.

The above-mentioned method may take the form of program code embodied in tangible media. When the program code is loaded into and executed by a machine, the machine becomes an apparatus for practicing the invention.

BRIEF DESCRIPTION OF THE DRAWINGS

The aforementioned objects, features and advantages of this invention will become apparent by referring to the following detailed description of the preferred embodiment with reference to the accompanying drawings, wherein.

DESCRIPTION

Figure 1:
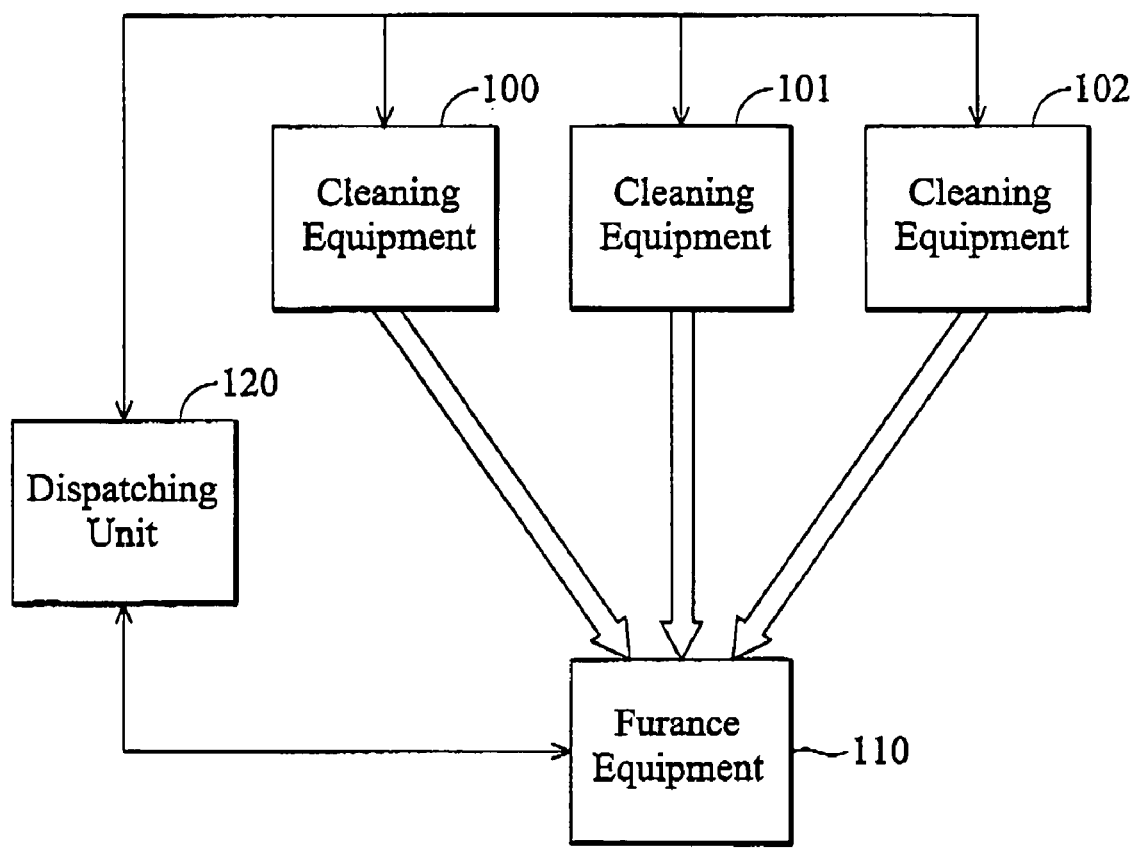
FIG. 1 is a schematic diagram illustrating the architecture of the dispatch system according to the present invention.

FIG. 1 illustrates the architecture of the dispatch system according to the present invention.

In semiconductor manufacturing, lots must enter equipment preceding the LPBE for removal of residual particles before entering the LPBE. In the embodiment, the LPBE is furnace equipment, and the preceding step's equipment is cleaning equipment, but the invention is not limited thereto.

The dispatch system includes furnace equipment 110 (LPBE), a plurality of cleaning equipment tools 100, 101 and 102 (preceding step's equipment) preceding the furnace equipment 110, and a dispatch unit 120. After cleaning, tools 100, 101 and 102 forwards lots to the furnace equipment 110 for further processing. The furnace equipment 110 utilizes long process time and batch process, in which several lots are processed simultaneously.

The dispatch unit 120 controls the process flow of each lot, and provides information regarding thereto. The dispatch unit 120 includes a dispatch engine executing dispatch logic and generating a list of dispatched lots for each equipment tool. The dispatch unit 120 provides reservation capability whereby the lots may be reserved for processing by designated equipment.

In advanced processing, equipment may have several capabilities to execute particular processes. To improve the utilization rate of the equipment, the capacity (CapaCapacity) of each capability and the required capacity (reqCapaCapacity) of the capability are defined as follows.

$$CapaCapacity = \frac{\sum_{eqp.capa.available}(eqp.capa.peakThroughput \times eqp.capa.planAvailable)}{6 \times 24}, \text{ and}$$

$$reqCapaCapacity = \sum_{lot.recp.capability=capabilityId} 1 + \sum_{lot.nextRecp.capability=capabilityId} 1,$$

where CapaCapacity represents the total capacity corresponding to a specific capability of all equipment, the unit of the capacity being batch (one batch has 6 lots, and each lot has 24 wafers), eqp.capa.peakThroughput represents the maximum capacity of the equipment in one hour, eqp.capa.planAvailable represents a time ratio of the equipment performing process of the capability, and reqCapaCapacity represents the quantity of lots subject to process the capability in both current and preceding steps (equipment).

Consequently, if the CapaCapacity×6 exceeds the reqCapaCapacity, it means capacity exceeds requirement (demand). Otherwise, requirement exceeds capacity. To achieve capacity/demand balance and best utilization rate of equipment, the CapaCapacity×6 and the reqCapaCapacity should be maintained equally, using the grouping, sorting, and reservation mechanisms of the invention.

Figure 2:
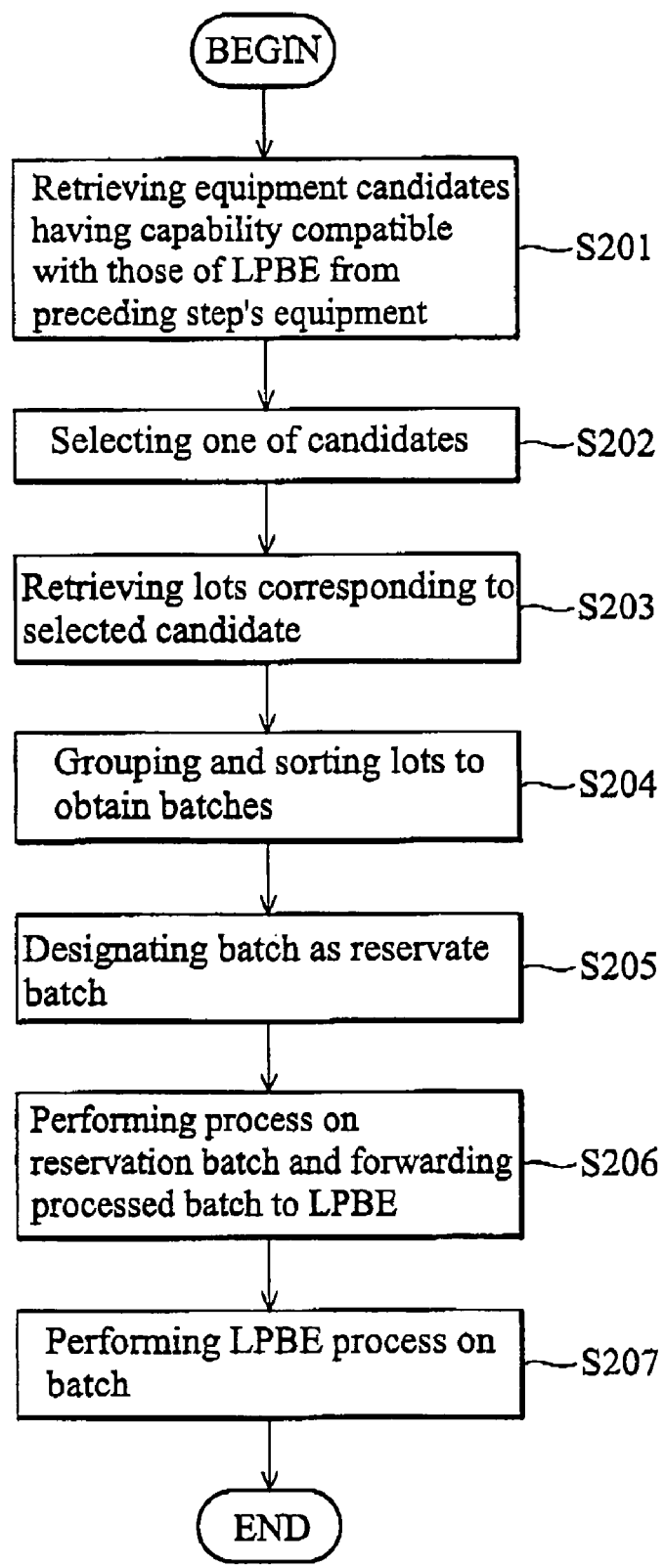
FIG. 2 is a flowchart showing the process of the dispatch method according to the present invention.

FIG. 2 shows the process of the dispatch method according to the present invention.

First, instep S201, furnace equipment 110 (LPBE) retrieves equipment candidates having capabilities compatible with those of the furnace equipment 110 from among the cleaning equipment 100, 101 and 102 (preceding step's equipment) in the dispatch unit 120. It is noted that the capabilities of the cleaning equipment 100, 101 and 102 and furnace equipment 110 can be stored in the dispatch unit 120 in advance, or the dispatch unit 120 can receive candidate listing from a Manufacturing Execution System (MES).

In step S202, at least one of the candidates is selected, and in step S203, lots corresponding to the selected candidate are retrieved from the dispatch unit 120. Then, in step S204, the lots are grouped and sorted to obtain a plurality of batches.

Figure 3:
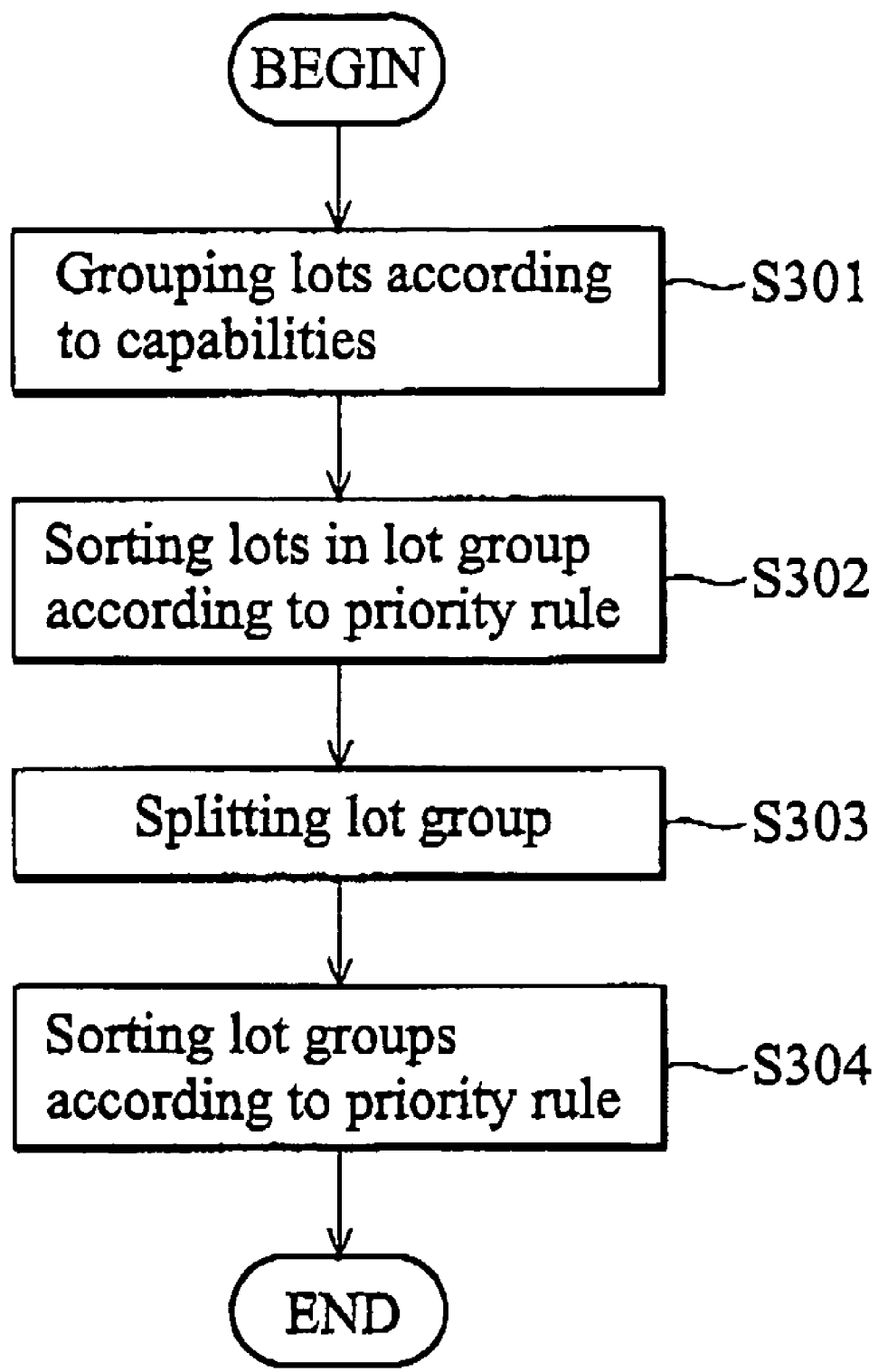
FIG. 3 is a flowchart showing a process of grouping and sorting according to the present invention.

FIG. 3 shows a process of grouping and sorting according to the present invention.

First, in step S301, the lots are grouped according to the capabilities of the furnace equipment 110, such that a plurality of lot groups is obtained. In step S302, the lots of each group are then sorted according to a priority rule. If the number of the lots in any lot group exceeds the maximum loading of the furnace equipment 110, in step S303, the lot group is split until the number of the lots in each lot group is smaller than the maximum. Then, in step 5304, the lot groups are further sorted according to the priority rule, such that batches are generated, and each batch has a priority.

The priority rule is used to determine whether designated super hot lots and hot lots exist in any of the lot groups, and determines stage target, queue time and priority of the lots in each lot group, and the quantity of wafers in each lot group. The priority rule respectively defines a weight for each determination item, such that each lot group has a respective total weight for sorting.

Referring to FIG. 2 again, in step S205, at least one of the batches is designated as a reserve batch according to corresponding capability and priority. Thereafter, in step S206, the selected candidate (cleaning equipment) executes a process, corresponding to the capability, on the reserve batch, and then forwards the processed batch to the furnace equipment 110. It is noted that the dispatch unit 120 can provide information of dispatched lots to both the selected candidate and the furnace equipment 110. Then, in step S207, the furnace equipment 110 then performs furnace process on the batch forwarded from the selected candidate.

The present invention thus provides a dispatch method and system for Long-duration Processing Batch Equipment (LPBE) that reserves lots at preceding steps in manufacturing process, thereby increasing utilization rate and ensuring the process quality of LPBE.

The method and system of the present invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The method and systems of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to application specific logic circuits.

Although the present invention has been described in its preferred embodiments, it is not intended to limit the invention to the precise embodiments disclosed herein. Those skilled in this technology can still make various alterations and modifications without departing from the scope and spirit of this invention. Therefore, the scope of the present invention shall be defined and protected by the following claims and their equivalents.

What is claimed is:

1. A computerized dispatch method for Long-duration Processing Batch Equipment (LPBE), comprising the steps of:
   retrieving equipment candidates having at least one capability compatible with that of the LPBE from among a plurality of equipment tools preceding the LPBE in process order;
   selecting one of the candidates;
   retrieving lots corresponding to the selected candidate;
   grouping and sorting the lots, such that a plurality of batches is obtained, in which each batch comprises a predetermined number of lots;
   designating at least one of the batches as a reserve batch; and
   executing a process by the selected candidate corresponding to the capability on the reserve batch, and forwarding the processed batch to the LPBE.

2. The method of claim 1 further comprising performing a LPBE process on the batch forwarded from the selected candidate.

3. The method of claim 1 wherein the LPBE comprises furnace equipment.

4. The method of claim 1 wherein the equipment tools comprise cleaning equipment.

5. The method of claim 1 wherein grouping and sorting the lots comprises:
   grouping the lots according to capability, such that a plurality of lot groups is obtained;
   sorting the lots of each lot group according to a priority rule; and
   sorting the lot groups according to the priority rule, such that the batches are obtained, and each batch has a priority.

6. The method of claim 5 wherein the predetermined number of the lots in each batch is the maximum number of lots that can be handled by the LPBE in one processing cycle.

7. The method of claim 6 further comprising splitting each lot group if the number of lots in the lot group exceeds the maximum number.

8. The method of claim 5 wherein the reserve batch is designated according to the capability and the priority of each batch.

9. The method of claim 5 wherein the priority rule is used to determine whether hot lots exist in any lot group.

10. The method of claim 5 wherein the priority rule is used to determine a stage target of the lots in each lot group.

11. The method of claim 5 wherein the priority rule is used to determine the priority of each lot group.

12. The method of claim 5 wherein the priority rule is used to determine the quantity of wafers in each lot group.

13. The method of claim 5 wherein the priority rule is used to determine a queue time of the lots in each lot group.

14. A computerized dispatch system for Long-duration Processing Batch Equipment (LPBE), comprising:
a plurality of equipment tools; and
a LPBE having at least one process capability, able to identify equipment candidates having the same capability from among the equipment tools preceding the LPBE, select one candidate, retrieve lots corresponding to the selected candidate, group and sort the lots to obtain a plurality of batches according to a lot grouping and sorting method, in which each batch comprises a predetermined number of lots, and designate at least one of the batches as a reserve batch;
wherein the selected candidate executes a process corresponding to the capability on the reserve batch, and forwards the processed batch to the LPBE.

15. The system of claim 14 wherein the LPBE further performs a LPBE process on the batch forwarded from the selected candidate.

16. The system of claim 14 wherein the LPBE comprises furnace equipment.

17. The system of claim 14 wherein the equipment tools comprises cleaning equipment.

18. The system of claim 14 wherein the lot grouping and sorting method comprises the steps of:
grouping the lots according to capability, such that a plurality of lot groups is obtained;
sorting the lots of each lot group according to a priority rule; and
sorting the lot groups according to the priority rule, such that the batches are obtained, and each batch has a priority.

19. The system of claim 18 wherein the predetermined number of the lots in each batch is the maximum number of lots that can be handled by the LPBE in one processing cycle.

20. The system of claim 19 wherein each lot group is further split if the number of lots in the lot group exceeds the maximum number.

21. The system of claim 18 wherein the reserve batch is designated according to the capability and the priority of each batch.

22. The system of claim 18 wherein the priority rule is used to determine whether hot lots exist in any lot group.

23. The system of claim 18 wherein the priority rule is used to determine a stage target of the lots in each lot group.

24. The system of claim 18 wherein the priority rule is used to determine the priority of each lot group.

25. The system of claim 18 wherein the priority rule is used to determine the quantity of wafers in each lot group.

26. The system of claim 18 wherein the priority rule is used to determine a queue time of the lots in each lot group.

27. A computerized dispatch method, comprising the steps of:
selecting one of equipment tools preceding a target equipment in process order, in which the equipment tools have at least one capability compatible with that of the target equipment;
designating at least one batch corresponding to the selected equipment tool before it is processed by the selected equipment tool; and
forwarding the batch to the target equipment after it is processed by the selected equipment tool,
wherein the batch comprises a predetermined number of lots being grouped and sorted according to a priority rule and respective capability.

28. The method of claim 27 wherein the predetermined number of the lots in the batch is the maximum number of lots that can be handled by the target equipment in one processing cycle.

29. The method of claim 27 wherein the priority rule is used to determine whether hot lots exist in each batch, a stage target of the lots in each batch, a priority of each batch, the quantity of wafers in each batch, or a queue time of the lots in the batch.

30. The method of claim 27 wherein the batch is designated according to the capability and a priority of the batch.

31. A computerized dispatch method for Long-duration Processing Batch Equipment (LPBE), comprising the steps of:
reserving lots corresponding to at least one equipment tool preceding the LPBE in process order before the lots are processed by the equipment tool; and
forwarding the lots to the LPBE after it is processed by the equipment tool.

32. The method of claim 31 wherein the equipment tool has at least one capability compatible with that of the LPBE.

33. The method of claim 31 further comprising grouping and sorting the lots into batches according to a priority rule and respective capability.

34. The method of claim 33 wherein each batch comprises a predetermined number of the lots, and the predetermined number is the maximum number of lots that can be handled by the LPBE in one processing cycle.

35. The method of claim 33 wherein the priority rule is used to determine whether hot lots exist in each batch, a stage target of the lots in each batch, a priority of each batch, the quantity of wafers in each batch, or a queue time of the lots in the batch.

* * * * *